US008422572B2

(12) United States Patent
Forck et al.

(10) Patent No.: US 8,422,572 B2
(45) Date of Patent: Apr. 16, 2013

(54) METHOD AND/OR OFDM DEVICE FOR SC-FDMA DATA TRANSMISSION

(75) Inventors: Andreas Forck, Berlin (DE); Holger Gaebler, Berlin (DE); Thomas Haustein, Potsdam (DE); Thomas Hindelang, Fürstenfeldbruck (DE); Volker Jungnickel, Berlin (DE); Wolfgang Zirwas, München (DE)

(73) Assignees: Nokia Siemens Networks GmbH & Co. KG, Munich (DE); Fraunhofer Gesellschaft zur Foerderung der Angewandten Forschung E.V., Munich (DE)

( * ) Notice: Subject to any disclaimer, the term of this patent is extended or adjusted under 35 U.S.C. 154(b) by 768 days.

(21) Appl. No.: 12/448,362

(22) PCT Filed: Mar. 22, 2007

(86) PCT No.: PCT/EP2007/052765
§ 371 (c)(1),
(2), (4) Date: Nov. 10, 2009

(87) PCT Pub. No.: WO2008/074518
PCT Pub. Date: Jun. 26, 2008

(65) Prior Publication Data
US 2010/0098182 A1 Apr. 22, 2010

(30) Foreign Application Priority Data
Dec. 18, 2006 (EP) .................................. 06026229

(51) Int. Cl.
*H04K 1/10* (2006.01)
*H04L 27/28* (2006.01)

(52) U.S. Cl.
USPC ............... 375/260; 455/59; 455/60; 370/277; 370/278; 370/281; 370/295

(58) Field of Classification Search .................... None
See application file for complete search history.

(56) References Cited

U.S. PATENT DOCUMENTS

2006/0094376 A1* 5/2006 Lee et al. ...................... 455/118
2007/0041464 A1* 2/2007 Kim et al. .................... 375/267
(Continued)

OTHER PUBLICATIONS

J-P. Javaudin, C. Dubuc, D. Lacroix, M. Earnshaw, "An OFDM evolution for the UMTS high speed downlink packet access," in Proc. IEEE "http://ieeexplore.ieee.org/xpl/RecentCon.jsp?punumber=9623", vol. 2, pp. 846-850, 2004.

(Continued)

*Primary Examiner* — Shuwang Liu
*Assistant Examiner* — Gina McKie
(74) *Attorney, Agent, or Firm* — Staas & Halsey LLP

(57) ABSTRACT

In a method and/or an OFDM device for SC-FDMA data transmission, a sequence of input data is transformed by means of a discrete transformation as transformed data signals of coded and modulated data signals on first frequency channels into a first frequency space over a first number of frequencies. The transformed data signals are mapped on second frequency channels in a second frequency space with a larger second number of frequencies. The transformed data signals on the second frequency channels are inverse-transformed using an inverse transformation. Data inversely transformed in such a way are provided for transmission. The transformed data signals are mapped into a frequency range of the second frequency channels in such a way that a constant component of the transformed data signals is mapped centrally within the frequency range.

20 Claims, 4 Drawing Sheets

U.S. PATENT DOCUMENTS

| | | | |
|---|---|---|---|
| 2007/0070879 A1* | 3/2007 | Yoshida et al. | 370/208 |
| 2007/0140106 A1* | 6/2007 | Tsai et al. | 370/208 |
| 2007/0147539 A1* | 6/2007 | Gorokhov et al. | 375/295 |
| 2012/0069794 A1* | 3/2012 | Kim et al. | 370/315 |
| 2012/0140698 A1* | 6/2012 | Noh et al. | 370/315 |
| 2012/0300726 A1* | 11/2012 | Han et al. | 370/329 |

OTHER PUBLICATIONS

J. Tubbax, B. Come, L. Van der Perre, L. Deneire, S. Donnay, M. Engels, "OFDM versus Single Carrier with Cyclic Prefix: A system-based comparison," in Proc. IEEE "http://ieeexplore.ieee.org/xpl/RecentCon.jsp?punumber=7588", vol. 2, pp. 1115-1119, 2001.

Desset, B. Come, B. Debaillie, J. Driessche, J. Tubbax, W. Eberle, J.W. Weijers, "Constant Envelope Modulation Techniques for Non-Linear Front-Ends," received: "http://www.imec.be/pacwoman/", Deliverables/WP4/WP4.2-IMEC-D4.2.1_constant_enveloppe_technique es-12-01-2004-V1.0.doc.

A. Goldsmith, P. Varaiya, "Capacity of fading channels with channel side information," *IEEE Trans. Inf. Theory*, vol. 43, No. 6, Nov. 1997.

Samardzija, P. Wolniansky, J. Ling, "Performance evaluation of the VBLAST algorithm in W-CDMA systems, *in Proc. IEEE Vehicular Technology Conference*, "http://ieeexplore.ieee.org/xpl/RecentCon.jsp?punumber=7588", vol. 2, pp. 723-727, 2001.

S.D. Morgera, "Efficient synthesis and implementation of large discrete Fourier transforms," *SIAM Journal Comput.*, vol. 9, No. 2, pp. 251-272, 1980.

K. Gentile, "The care and feeding of digital, pulse-shaping filters," *recieved*: "http://www.rfdesign.com".

H.G. Myung, J. Lim, D. J. Goodman, "Peak-to-average power ratio of single carrier FDMA signals with pulse shaping," *Proc. IEEE PIMRC*, Sep. 11-14, 2006, Helsinki, Finland.

H. Chen, V. Jungnickel, V. Pohl, C. von Helmolt, "A multicode space-frequency RAKE receiver," in: Proc. 38$^{th}$ Asilomar Conference on "http://ieeexplore.ieee.org/xpl/RecentCon.jsp?punumber=9626", vol. 1, pp. 672-676, 2004.

3GPP TR 25.814 V7.0.0 (Jun. 2006), 3rd Generation Partnership Project;Technical Specification Group Radio Access Network; Physical layer aspects for evolved Universal Terrestrial Radio Access (UTRA) (Release 7).

Myung H G et al: "Single Carrier FDMA for Uplink Wireless Transmission" IEEE Vehicular Technology Magazine, IEEE,,US, Bd. 1, Nr. 3, Sep. 2006, pp. 30-38, XP001249128 ISSN: 1556-6072 * p. 32-p. 33.

"SC-FDMA (FDD / ÄTDDÜ)" 3RD Generation Partnership Project (3GPP); Technical Report (TR), XX, XX, vol. VO.3.1, Oct. 2005,pp. 29-37.

Ritt, Catt, Shrcwc: "Offset DFT-Spread OFDM with Generalized Raised-Cosine Filters for Pulse Shaping" 3GPP TSG-RAN WG1 #44 Meeting,—Feb. 17, 2006.

Huawei: "Optimum family of spectrum-shaping functions for PAPR reduction in SC-FDMA" 3GPP TSG RAN WG1 43,—Nov. 11, 2005.

Alcatel: "Effect of different ST/SF Coding and Mapping schemes on the PAPR of the SC-FDMA in E-UTRA Uplink" 3GPP TSG RAN WG1 45,—12. (May 12, 2006).

* cited by examiner

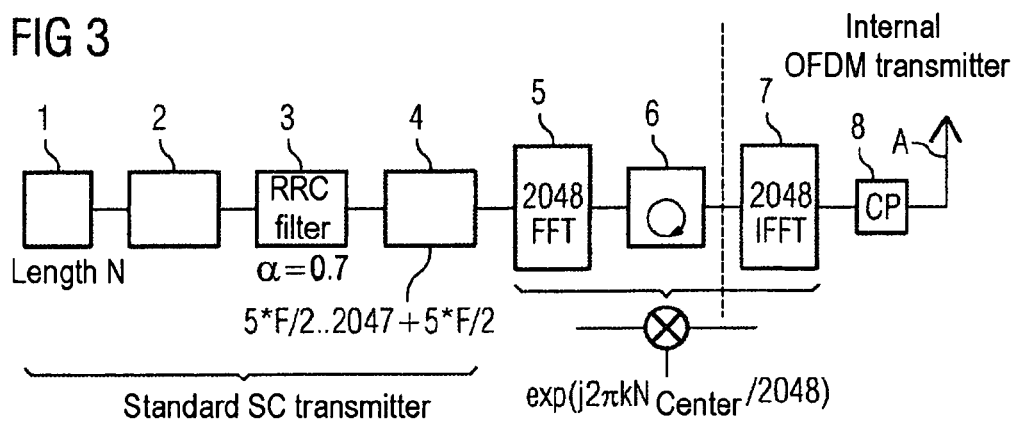
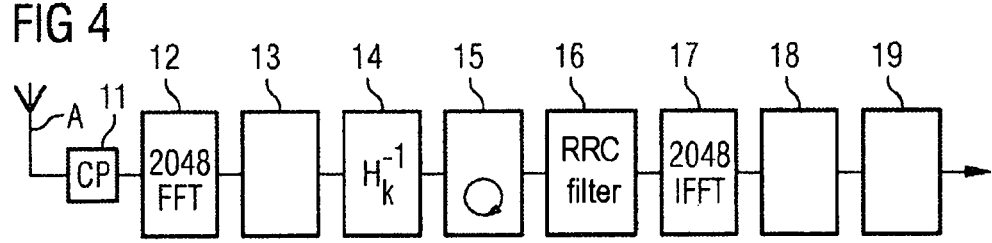
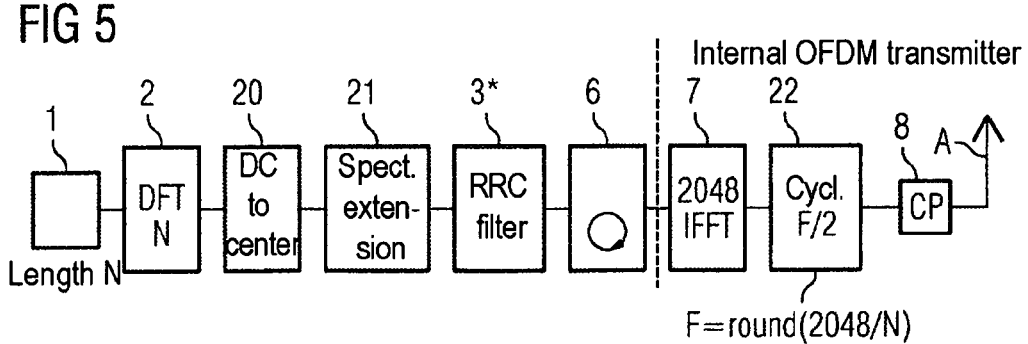
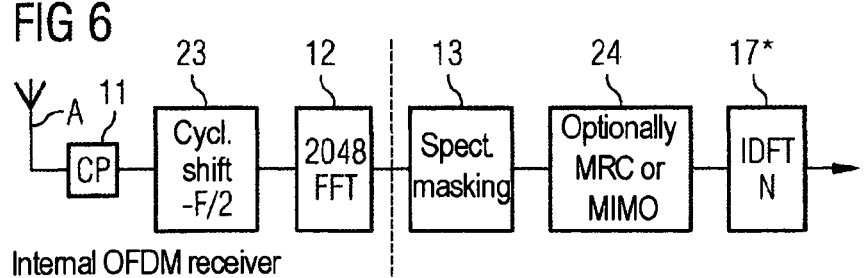

METHOD AND/OR OFDM DEVICE FOR SC-FDMA DATA TRANSMISSION

CROSS REFERENCE TO RELATED APPLICATIONS

This application is based on and hereby claims priority to PCT Application No. PCT/EP2007/052765 filed on Mar. 22, 2007 and European Application No. EP06026229 filed on Dec. 18, 2006, the contents of which are hereby incorporated by reference.

BACKGROUND OF THE INVENTION

The invention relates to a method for SC-FDMA data transmission.

In mobile radio systems, particularly in transmissions in the uplink, that is to say from a mobile station to a fixed base station, are often limited by the power of the mobile station or of a corresponding terminal. Other limiting factors are temporal dispersion and interference. Portable devices are intended to have the lowest possible power consumption but at the same time to transmit data over distances of several kilometers. A power amplifier in portable devices of this kind is a problematic component in this regard, since the linearity of a power gain needs to cover both aspects, the gain dynamics of the channel and the power dynamics of modern radio-based transmission schemes, which are based on multicode or multicarrier transmission. A combination of their physical layer resources, that is to say codes or subcarriers, usually increases the power dynamics, even though the elemental waveforms have constant power, as is known by way of example from [1] J.-P. Javaudin, C. Dubuc, D. Lacroix, M. Earnshaw "An OFDM evolution for the UMTS high speed downlink packet access" in Proc. IEEE "http://ieeexplore.ieee.org/xpl/RecentCon.jsp?punumber-9623" vol. 2, pp. 846-850, 2004.

For communication which is efficient in terms of power, minimum power dynamics are generally desirable. In this respect, the lead (back-off) can be reduced at the operating point of the amplifier and the efficiency of the amplifier can be improved, as is known from [2] J. Tubbax, B. Come, L. Van der Perre, L. Deneire, S. Donnay, M. Engels, "OFDM versus Single Carrier with Cyclic Prefix: A system-based comparison", in Proc. IEEE "http://ieeexplore.ieee.org/xpl/RecentCon.jsp?punumber=7588", vol. 2, pp. 1115-1119, 2001. The same amplifier allows the terminals to bridge a greater distance.

Single carrier transmission (SC transmission) is known to have lower power dynamics. For simple equalization of the transmission channel, these can be combined with a cyclic extension, as is known from [3] C. Desset, B. Côme, B. Debaillie, J. Driessche, J. Tubbax, W. Eberle, J. W. Weijers, "Constant Envelope Modulation Techniques for Non-linear Front-Ends," available from: "http://www.imec.be/pac-woman/", Deliverables/WP4/WP4.2-IMEC-4.2.1_constant_enveloppe_technique es-12-01-2004-V1.0.doc. and the references cited therein. More recent information theory, such as [4] A. Goldsmith, P. Varaiya, "Capacity of fading channels with channel side information" IEEE Trans. Inf. Theory, vol. 43, No. 6, November 1997, shows that the diversity in radio-based channels can be utilized by transmitting the signals in the spectral range with the best transmission quality.

To apply frequency domain resource splitting to multiple users (Frequency-Domain-Multi-User Scheduling), SC transmission is currently being developed further into a multiple access scheme which makes use of the advantages of both multipath and multisubscriber diversity. Consequently, SC-FDMA (single-carrier frequency-division multiple access) was proposed in [5] 3GPP TR 25.814 V7.0.0 (2006-06), available from: "http://www.3gpp.org", for transmissions in the uplink in the long-term further development of cellular access networks (long term evolution) in the $3^{rd}$ Generation Partnership Project (3GPP).

Virtual antenna designs are known generally from [8] D. Samardzija, P. Wolniansky, J. Ling, "Performance evaluation of the VBLAST algorithm in W-CDMA systems" in Proc. IEEE Vehicular Technology Conference, "http://ieeexplore.ieee.org/xpl/RecentCon.jsp?punumber=7588", vol. 2, pp. 723-727, 2001, these subsequently being used as appropriate for the purpose of correct detection of the SC-FDMA signals.

An exemplary algorithm for implementing a discrete Fourier transformation using the "Mutual Prime Factor Cyclic Algorithm" (MPFCA) is known generally from [10] S. D. Morgera, "Efficient synthesis and implementation of large discrete Fourier transforms" SIAM Journal Comput., vol. 9, No. 2, pp. 251-272, 1980, for example.

Various aspects of data processing and transmission of data are known generally from [6] K. Gentile, "The care and feeding of digital, pulse-shaping filters", available from: "http://www.rfdesign.com"; [7] H. G. Myung, J. Lim, D. J. Goodman "Peak-to-average power ratio of single carrier FDMA signals with pulse shaping" Proc. IEEE PIMRC 11-14 September 2006, Helsinki, Finland and [9] H. Chen, V. Jung-nickel, V. Pohl, C. von Helmolt, "A multicode space-frequency RAKE receiver," in: Proc. $38^{th}$ Asilomar Conference on "http://ieeexplore.ieee.org/xpl/RecentCon.jsp?punumber=9626", vol. 1, page(s): 672-676, 2004.

Hence, SC-FDMA transmission using a DFT (Discrete Fourier Transformation) pre-coding unit and direct mapping of the result onto subcarriers of the subsequent IFFT (Inverse Fast Fourier Transformation) input signal is currently being contemplated. This provides advantages together with spectrally efficient modulation formats, but the pre-coding gain is reduced or even becomes negligible in conjunction with power-efficient modulation schemes.

SUMMARY

One potential object is to propose a method for SC-FDMA data transmission which allows less complex data processing and a reduction in the power consumption particularly of mobile transmission apparatuses. The aim is also to propose an OFDM apparatus having a control device or components which are designed and/or controlled for the purpose of carrying out a method of this kind.

The inventors propose a method for SC-FDMA (Single Carrier Frequency Division Multiple Access) data transmission, in which a succession of input data is transformed by a discrete transformation as transformed data signals of encoded and modulated data signals onto first frequency channels in a first frequency space over a first number of frequencies, the transformed data or data signals are mapped onto second frequency channels in a second frequency space with a greater second number of frequencies, the transformed data on the second frequency channels are inverse-transformed by an inverse transformation, and data signals inverse-transformed in this manner are provided for transmission. On the basis of this, the transformed data signals are mapped into a frequency domain of the second frequency channels such that a direct component of the transformed data signals is mapped centrally within the assigned frequency domain in the second frequency space. In this case, mapping is understood to mean particularly direct transmission by copying, movement from one memory to memory locations in another memory, and optionally also mapping using a mapping matrix.

The frequency domain of the second frequency channels is preferably formed by a, in particular, directly successive number of second frequency channels equal to the first number of frequencies of the transformed data signals.

The transformed data signals are preferably mapped onto, in particular, directly adjacent frequency channels of the second frequency channels.

The transformed data signals can be mapped with a cyclic shift into the frequency domain of the second frequency channels. This can easily be performed by a shift operation within a memory or memory area. More complex but nevertheless still advantageous in terms of complexity is also mapping using a mapping matrix, for example, however.

A first half of the transformed data signals can be mapped, including the direct component, in the frequency domain of the second frequency channels following a second half of the transformed data signals. In this case, preferably the first half of the transformed data signals is mapped, including the direct component, onto the first instances of the second frequency channels and the second half of the transformed data signals is mapped onto the last instances of the second frequency channels, and then a joint cyclic shift of all the frequency channels used to the assigned frequency domain is performed.

The transformed data signals are preferably subjected to such spectral extension, for the purpose of mapping into the frequency domain of the second frequency channels, that redundancy is produced in the second frequency space. Preferably, the extension involves the transformed data signals being mapped as a first block into the frequency domain of the second frequency channels and the transformed data signals being mapped as a further block redundantly downstream of the first block into the frequency domain of the second frequency channels, with the direct component being mapped in the transition area between the two blocks. The concept of extension is intended to be understood broadly in this context, including within the meaning of spreading, this not being limited to the spreading which is known per se from mobile radio. In particular, it is also intended to be understood to mean that the spectrum in which the data signals are transmitted is expanded by periodic reuse of the transformed data signals, so that redundancy is added in the second frequency space.

Preferably, additional filtering is performed in the frequency domain.

Preference is also given, in particular, to a method for processing data transmitted in line with a method of this kind, in which the transmitted data signals are transformed by a transformation into the frequency domain, are mapped by an inverse procedure onto first frequency channels in a first frequency space over the first number of frequencies and are inverse-transformed by an inverse transformation.

In view of the low data processing complexity, it is advantageously possible for a Fourier transformation, particularly a discrete or fast Fourier transformation, to be used for the transformation and the inverse transformation.

Equivalent preference is given to a method for SC-FDMA data transmission, in which a succession of input data, or a sequence of data signals with a length of data values is provided, a corresponding number N of samples is increased by a factor for the purpose of oversampling, and in the time domain an envelope formed therefrom is multiplied by a mean subcarrier oscillation or mean subcarrier frequency, particularly in line with $\exp(j2\pi k N_{center}/N)$, for the succession of input data. The increase in the number of samples is followed particularly by the performance of RRC filtering with a filter coefficient, the value of the filter coefficient $\alpha$ preferably being set in the range $0.5 \leq \alpha < 1.0$, particularly in the range $0.6 \leq \alpha \leq 0.8$. The multiplication is expediently preceded by the removal of a transmission sequence for the data.

The data to be transmitted are particularly preferably transmitted as data modulated by BPSK or QPSK. However, it is also possible for data processed using other modulation methods to be transmitted using such a method, initial examinations showing that it is possible to attain a particularly advantageous result in comparison with known methods, particularly in the case of constant-amplitude modulation methods.

The present procedure or apparatus therefore relates to a complete transmission/reception chain for SC-FDMA transmission using radio-based multipath fading channels in which additional spectral extension and compression are used as well as special mapping of the signals onto the subcarriers in the desired resource unit. This allows a further reduction in the power dynamics to be attained in comparison with the solution outlined in the 3GPP.

Such a procedure is therefore used to solve a crucial problem in carrier mapping, that is to say mapping onto carriers of a transmission resource. Although there is disadvantageously a slight increase in the bandwidth which is required for transmission, this advantageously allows the use of an arbitrarily scaleable bandwidth. A fundamental advantage is a significant improvement in the peak-to-average power ratio.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows a succession of exemplary components for the implementation of such data processing with filtering in the time domain for the purpose of providing data which are to be transmitted, FIG. 4 shows components of a receiver device for receiving data processed in line with FIG. 3, FIG. 5 shows a transmitter-end arrangement of components in line with an alternative embodiment, FIG. 6 shows receiver-end components for processing a data signal provided in line with FIG. 5.

DETAILED DESCRIPTION OF THE PREFERRED EMBODIMENT

Figure 1:
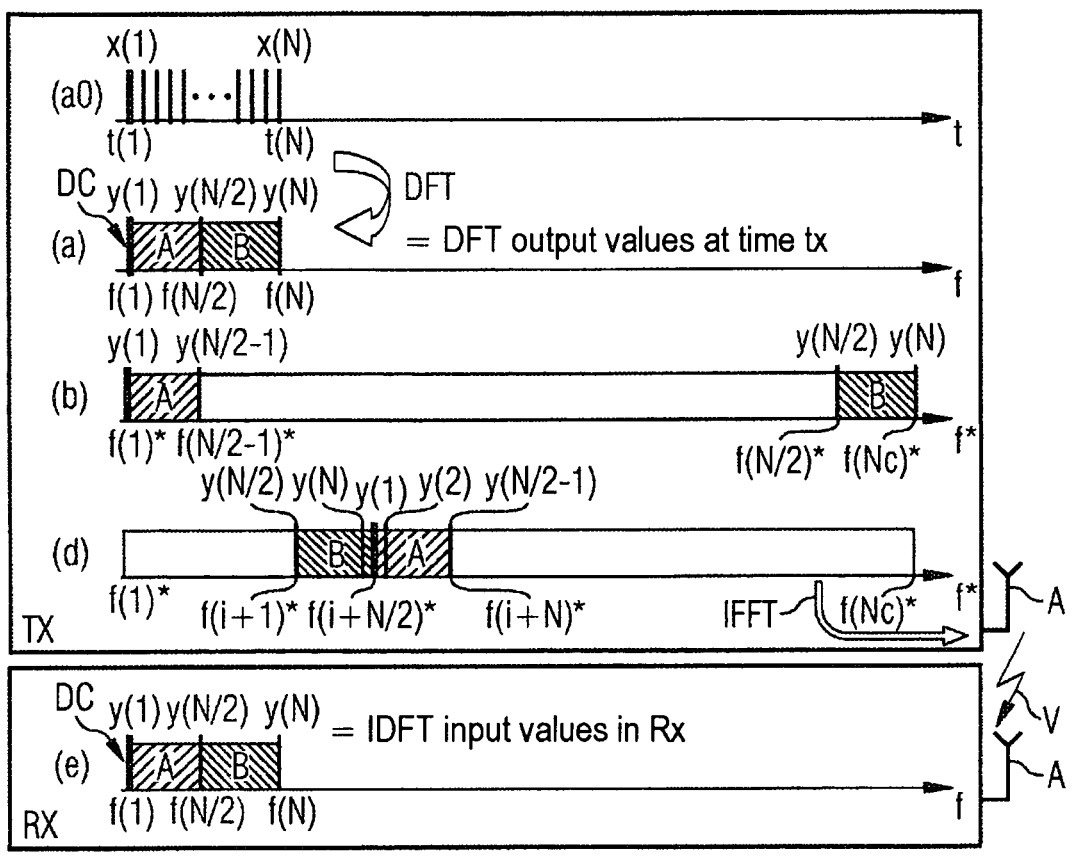
FIG. 1 shows schematic depictions to illustrate various data processing steps for the processing of a data transmission.

Reference will now be made in detail to the preferred embodiments of the present invention, examples of which are illustrated in the accompanying drawings, wherein like reference numerals refer to like elements throughout.

FIG. 1 shows a first procedure for processing data which are transmitted by SC-FDMA transmission from a transmitter-end device TX to a receiver-end device RX. The transmitter-end device TX is preferably a mobile terminal in the fashion of a mobile radio, for example. The receiver-end device RX is preferably a fixed-location station, particularly a base station in a mobile radio network. The transmission between the transmitter-end device TX and the receiver-end device RX is preferably, but not necessarily, effected by a radio-based connection or by a radio interface V which is set up via antennas that are respectively associated with these two devices TX, RX. Both the transmitter-end device TX and the receiver-end device RX usually comprise a multiplicity of inherently known components which can preferably also be designed and/or programmed for the purpose of carrying out the preferred procedures described. In particular, such components are memory elements, processors and possibly further circuit elements.

In a preparatory step a0, a succession of input data $x(i)$, $i=1, 2, 3, \ldots, N$ is provided in a preferably chronological order, that is to say at discrete times $t(1), \ldots, t(N)$, as outlined schematically over time t. These are input data $x(i)$ provided as modulated and preferably also as encoded data signals.

In a first actual step a, this succession of discrete input data $x(1), \ldots, x(N)$ is transformed into a first frequency space over a first number of frequencies of first frequency channels $f(1), f(2), f(3), \ldots, f(N)$, where the number of frequency channels preferably corresponds to the number N of the samples. This is done by transformation of the input data $x(i)$, the use of a fast or preferably a discrete Fourier transformation DFT being preferred for such a transformation. This is shown by a cohesive block over the frequency f of the first frequency space for a particular time tx. When a discrete Fourier transformation DFT is used, and particularly when a fast Fourier transformation is used, the number of first frequency channels $f(1), \ldots, f(N/2), \ldots, f(N)$ corresponds to the number N with the succession of input data $x(1), \ldots, x(N)$. In the usual way for Fourier transformations, the first transformed data value $y(1)$ in the first frequency channel $f(1)$ corresponds to a direct component DC or a DC voltage component.

In a second step (b), the cohesive block is divided into a first block A and into a second block B. The transformed data signals or data $y(i)$ are then mapped onto second frequency channels $f(1)^*, f(2)^*, \ldots, f(N)^*, \ldots, f(Nc)^*$ in a second frequency space with a greater second number of frequencies Nc than the number of frequencies, corresponding to the number N, in the first frequency space. In this case, the mapping is effected such that the transformed data values $y(1), \ldots, y(N/2-1)$ in the first block A are mapped onto, in particular, directly adjacent frequency channels $f(1)^*, \ldots, f(N/2-1)^*$ in the second frequency space, and the adjacent transformed data $y(N/2), \ldots, y(N)$ in the second block B are likewise mapped onto, in particular, directly adjacent frequency channels $f(N/2)^*, \ldots, f(Nc)^*$ in the second frequency space.

In the case of the exemplary procedure shown in FIG. 1, the mapping into the second frequency space is effected such that the transformed data $y(1), \ldots, y(N/2-1)$ in the first block A are mapped onto the corresponding number of first frequency channels $f(1)^*, \ldots, f(N/2-1)^*$ in the second frequency space, and the transformed data $y(N/2), \ldots, y(N)$ in the second block B are mapped onto the last or highest-value frequency channels $f(N/2)^*, \ldots, f(Nc)^*$ in the second frequency space, as outlined by the frequency f* of the second frequency space. This mapping means that from the point of view of an algorithm for performing an, in particular, fast Fourier transformation or a discrete Fourier transformation the two frequency blocks are in the form of a block which is cohesive again, the transposed data $y(N/2), \ldots, y(N)$ in the second block B now being situated ahead of the transposed data $y(1), \ldots, y(N/2-1)$ in the first block A. In particular, a total block of this kind contains the direct component DC or the first data value $y(1)$ arranged or mapped centrally in between the remaining data values in the two blocks B, A.

In an optional third step (d), the transformed data $y(N/2), \ldots, y(N), y(1), \ldots y(N/2-1)$ converted to the second frequency domain are also mapped into a frequency domain $f(i+1)^*, \ldots, f(i+N/2)^*, \ldots, f(i+N)^*$ which is preferred for a subsequent transmission. This range may be a frequency domain, for example, for which particularly low interference in comparison with other frequency domains can be expected on the radio interface that is to be used. It is also possible to have a corresponding shift to a special frequency domain which was engaged for the transmitting device.

Next, an inverse Fourier transformation, particularly an inverse discrete Fourier transformation or an inverse fast Fourier transformation IFFT of the second frequency space, that is to say of all the data over the second frequency channels $f(1)^*, \ldots, f(Nc)^*$, is performed in order to inverse-transform the transformed and mapped data into the time domain and to provide them in the time domain as signals or data which are to be transmitted or to transmit them via the radio interface V.

Whereas one particularly preferred procedure involves the second step being used to describe mapping of the transposed data $y(N/2), \ldots, y(N)$ in the second block B onto the higher-value frequency channels and then a simple cyclic shift in all of the transformed data into the frequency domain desired for the transmission, direct mapping of the data $y(1), \ldots, y(N)$ transformed into the first frequency domain into the desired frequency domain $f(i+1)^*, \ldots, f(i+N)^*$ of the second frequency domain is also possible, in principle. The special arrangement with the direct component or the first transposed data value $y(1)$ in a central position between the remaining data values can optionally also be implemented through the use of an appropriate mapping matrix in this case.

The receiver-end device RX subjects the data transmitted in this manner to inverse transformation and inverse mapping as appropriate, to which end a Fourier transformation and then appropriate inverse mapping are in turn applied. The data which are thereby subjected to transformation and inverse mapping then again have the direct component DC as a first data value $y(1)$ over a first frequency channel $f(1)$ in the first frequency space and a maximum data value $y(N)$ over an appropriate frequency channel $f(N)$ in the first frequency space. It should naturally be assumed that this reconstruction does not involve provision of exactly the same data as were produced by the transmitter end in a first step a, since alterations and losses in the transmitted signal usually arise on the transmission link. Some of these alterations are reversed by the channel equalization, but there remains a more or less pronounced alteration in the noise. Without noise, the transmitted signals in the second frequency domain are reconstructed completely, however, before the specific detection process for SC-FDMA is applied. These data signals or data $y(1), \ldots, y(N)$ which have been subjected to Fourier transformation, equalization and inverse mapping in a receiver-end device RX are provided as input values for an inverse Fourier transformation, for example an inverse discrete Fourier transformation IDFT.

Naturally, additional data processing can be performed in all method stages. In particular, data filtering can be performed in the frequency domain. Other methods—known in the data processing of data which is to be transmitted via a radio interface—for optimizing the signal and/or for assigning particular time slots, codes and/or frequencies can also be used, and applied in combination with the data processing described with reference to the steps described, in a manner which is known per se.

Figure 2:
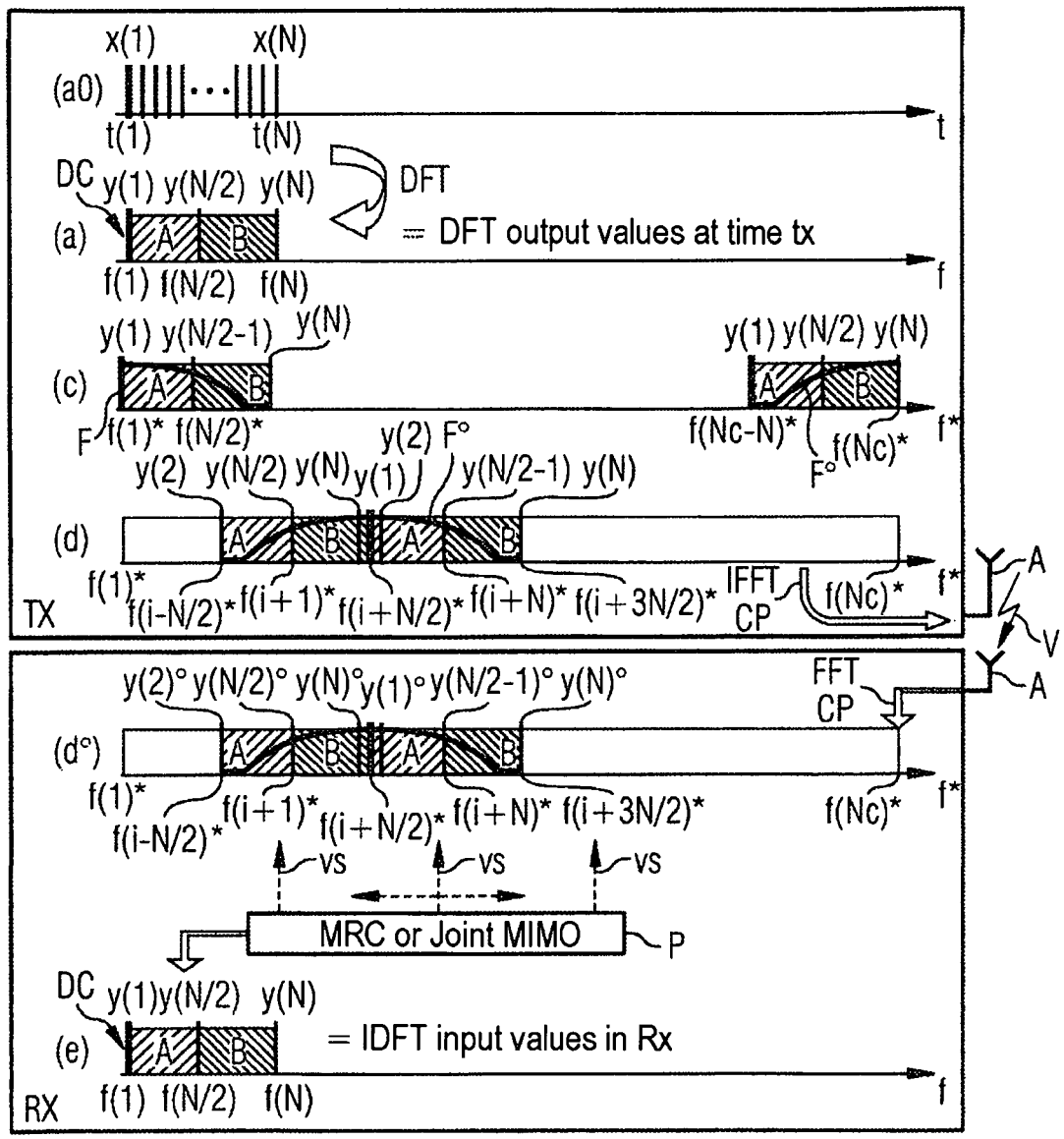
FIG. 2 shows an alternative procedure in comparison with FIG. 1.

FIG. 2 is used to describe a second exemplary procedure, with only differences from the first procedure being discussed below and reference being made to the comments relating to FIG. 1 for the further aspects.

As FIG. 2 shows, the second step c therein involves extending the transformed discrete data y(1), . . . , y(N) during the mapping into the second frequency space or after this mapping such that redundancy is produced. As shown, this involves the transformed data y(1), . . . , y(N) being put completely onto the first N frequency channels f(1)*, . . . , f(N/2)* of the second frequency domain. In addition, all the transformed data y(1), . . . , y(N) are put onto the last N frequency channels f(Nc−N)*, . . . , f(Nc)* of the second frequency domain. This in turn prompts the direct component y(1) to come to rest centrally between the remaining transformed and mapped data. Preferably, during the mapping onto the downstream frequency channels with the number N, the direct component DC or y(1) is not transmitted at the same time or is filtered out by a filter function F°.

Optionally, in the third step d, all of the transformed, mapped and redundant extended data y(2), . . . , y(M), y(1), y(2), . . . , y(N) can be mapped, preferably cyclically shifted, back into a frequency domain which is desired for the transmission within the second frequency space.

At the receiver end, the receiver-end device RX performs a transformation into the frequency domain, so that in an appropriate receiver-end step d°, apart from alterations as a result of the actual transmission, ideally the data are available which are available after the third transmitter-end processing step d. From this data, there is inverse mapping onto the number of frequencies for the first frequency channels f(1), . . . , f(N) in the first frequency space such that the direct component DC is again allocated to the first frequency carrier f(1) as a first data value y(1).

To remove the redundancy, it is possible to use maximum ratio combining MRC or what is known as Joint MIMO (Multiple Input Multiple Output) in a manner which is known per se. It is thus possible for the reconstruction to be effected by three tapping-off operations vs, for example, which tap off the data in the second frequency domain r at the interval of the number of frequencies or the number N and reconstruct the relevant data value in the first frequency domain of the frequency f. Preferably, such reconstruction can be performed in a processor P which is also used for other data processing in the receiver-end device. Ultimately, in a second receiver-end step e which is shown, input values are again available for an inverse Fourier transformation, particularly an inverse discrete Fourier transformation IDFT, in order to recover the data in the time domain.

The procedures shown in FIG. 1 and FIG. 2 are therefore closely oriented to a conventional implementation of the SC-FDMA design, where they use a generic DFT and IDFT approach preferably in conjunction with spectral extension and with special carrier mapping in order to be able to allow transmission for any convertible block magnitude. If a cyclic shift is intended to take place, the DFT can be efficiently implemented using a mutual prime factor cyclic algorithm, called MPFCA, as is known independently from [10]. In practical implementation, a 1200-point DFT is more complex than a similarly dimensioned fast Fourier transformation with 2048 points by merely a factor of 4 or more.

A mapping and inverse mapping process is therefore performed in a DFT-based SC-FDMA chain with preferably spectral expansion or extension. FIGS. 1 and 2 outline data values x(1), . . . , x(N) in a time series for a preparatory data step a0 which are converted by a Fourier transformation into the frequency domain, this being outlined by a further row of illustration as a first step a. In a subsequent second step, the N data items or data signals are mapped onto a larger second frequency domain with a greater number Nc of subcarriers or frequency channels. In this case, spectral extension in conjunction with particularly the second step c, and preferably filtering or multiplication using an RRC (Route Raised Cosine) spectrum can be performed. A preferably cyclic shift takes place in a subsequent step in order to arrive at the values in the frequency space which are shown by the third step d. In this case, the values or data are transferred or mapped into the spectrum assigned for transmission.

In the receiver-end device RX, the signal from the k-th subscriber, for example, is masked out of the spectrum as the received transmitted signal. In the case of a redundant data arrangement, signals are reconstructed on the redundant subcarriers using preferably the virtual antenna design with MRC or joint MIMO signal processing. For each data stream of data sequences possibly transmitted in parallel with one another, the resultant vector of the length or number N is then routed to the inverse discrete Fourier transformation. Such a procedure can be implemented particularly in the case of transmission based on OFDM, where a signal is transmitted in the time domain, with a particular spectrum component being assigned in the frequency domain for each transmission carrier, user or transmitting station.

A design as shown in FIG. 2 allows implementation as a transmitter for narrow bandwidths, which is simple to produce. Although the mathematically equivalent principle of filtering the time domain may result in distortions or interference in comparison with the implementation of the design with a shift in the frequency domain, it is still possible for simple applications and simple devices to attain a sufficiently good processing quality for the data which is to be transmitted or which are transmitted. The embodiment described briefly above is therefore described in more detail below.

A first aspect looks at the implementation of smaller or more narrowband digital Fourier transformations through oversampling (up-sampling). It is assumed that N is the block magnitude or the number of samples of the data to be processed. A discrete Fourier transformation (DFT) in line with $$x_k = \sum_{m=0}^{M-1} X_m e^{-j2\pi \frac{mk}{M}} \tag{0}$$

uses M>N as an up-to-date DFT magnitude. It is also assumed that M=N·F, where F is an integer factor for the oversampling. The DFT of the magnitude or number N can now be implemented by oversampling the sequence, with $X_m = X_\alpha$, if m=α·F, or otherwise with $X_m = 0$ and with the integer number α=0 . . . N−1, after which the signals are routed to the larger DFT of the magnitude M and only the first N output signals are processed further.

On the basis of the design of a conventional SC-FDMA transmitter as shown in FIG. 3, this first of all involves the shaping of a conventional SC-FDMA signal which is then mapped into the frequency domain on a given physical resource unit. This involves the use of the conventional waveform as a reference feature for the new scheme.

A conventional SC-FDMA waveform is produced by oversampling the data sequence with the factor F in a first step. To allow an approach using physical resource units with any bandwidth, it is possible to dispense with the requirement that the factor F is an integer number. This may be prompted by the practical requirements for block magnitudes which are not an integer fraction of $N_c$ to be supported. The factor F for oversampling is then approximated by F=round($N_c$/N), that is to say by rounding the quotient. This approach is useful particularly when the factor F is large, that is to say N<<$N_c$, where $N_c$ is the magnitude of the fast Fourier transformation (FFT) in the front portion of the internal OFDM transmitter. Otherwise, the waveform would be disturbed and the performance may be reduced.

In the next step, a conventional "square root raised cosine" (RRC) filter may be used in the time domain. A sequence of the length $N_c$ is removed (stamped out) in the boundaries based on the above formula (0) for $x_k$. The start and stop are chosen such that the sequence is delayed by the rounding factor round (2.5·F) samples in order to compensate at least for the greatest part of the filter delay. The RRC-filter signal is stretched or expanded in the time domain and therefore becomes narrowband in the frequency domain. After the signal has passed through a, in particular, fast Fourier transformation with the magnitude $N_c$, a cyclic shift is performed with respect to the spectral position of the physical resource unit. Ultimately, the signal is routed to the inverse Fourier transformation, particularly inverse fast Fourier transformation of the internal OFDM transmitter. In this case, the succession of the Fourier transformation, cyclic shift and inverse Fourier transformation is ideally mathematically equivalent to multiplication of the envelope by the central subcarrier oscillation in the physical resource, that is to say to a multiplication in line with $\exp(j2\pi KN_m/N)$.

The implementation of the RRC filter in the time domain as shown in FIG. 3 is more complex than in the frequency domain, where the oversampled sequence would be routed directly to the Fourier transformation and then to the subsequent filtering. With frequency domain filtering, the time domain signal is therefore shifted cyclically by the rounded number round (F/2) of samples after the inverse Fourier transformation in order to achieve the condition of being in phase with the time-domain-filtered conventional waveform. In this case, the waveform should start with those F samples which correspond to the first symbol in the data block.

An embodiment as shown in FIG. 3 without an RRC filter would correspond to an implementation of a smaller DFT with a large oversampled signal, that is to say a signal with a factor. This simultaneously corresponds to the use of an RRC filter 3 with a value $\alpha=0$ or an implementation of a smaller DFT with a spectrally extended signal by an FFT with a length of 2048 samples, for example, where N corresponds to a factor of 2048, for example. A value of $\alpha=1$ is a restriction to a desired range without adjacent symbols at the sampling time alongside the sampling time or subsequent chattering in the form of intersymbol interference. In principle, $\alpha$ can also be chosen differently, however. The advantage of the embodiment shown in FIG. 3 is particularly also that no transformation to the frequency domain is required.

FIG. 3 is used to outline a first exemplary transmitter as a transmitter-end device TX. The components shown, as in the other figures too, are merely those components which are required in order to understand the preferred method sequence. Usually, the order of the components can be partially interchanged or it is possible to add additionally further components. A component is to be understood to mean process-related and/or hardware-related elements.

In this case, FIG. 3 shows an exemplary conventional SC transmitter, wherein time domain filtering can be used in order to produce SC-FDMA waveforms. To start with, a burst source unit 1 provides a burst or a data sequence with a length or number of N data values. A second block or a second unit 2 then performs oversampling, with the number of samples being increased by the factor F for oversampling as an oversampling factor. The oversampling factor can be ascertained by the inherently known function F=round(2048/N), for example. A third block 3 then performs RRC filtering with an exemplary filter coefficient $\alpha=0.7$. Next, the transmission sequence is removed (stamp out), which is done in a fourth block 4. With mapping in line with 5*F/2 ... 2047+5*F/2, the rising edge of the first symbol to be processed is still in a desired time window in the case of 2500 samples. This takes account of the fact that the RRC filter in line with the third block 3 effects a delay of 3F. These first four components are essentially a standard single-carrier transmitter.

Subsequently, a fifth block 5 effects a Fourier transformation with a number of discrete points equal to the number Nc of down-sampled or up-sampled discrete points for the second block 2. A sixth block performs the mapping onto the desired frequency domain for the transmission. Preferably, the sixth block 6 effects a cyclic shift for this purpose. Finally, a seventh block 7 effects an inverse fast Fourier transformation IFFT, and ultimately an eighth block 8 attaches a cyclic prefix CP, for example by attaching the last 128 samples additionally to the front of the data sequence. Blocks 7 and 8 form an internal OFDM transmitter. Blocks 5 to 7 can also be expressed in this instance by the function $\exp(j2\pi N_{center})$/2048).

FIG. 4 shows a conventional SC-FDMA receiver with a frequency domain filter, this receiver being designed as a receiver-end device RX for processing transmitted data which have been transmitted by a transmission arrangement as shown in FIG. 3.

To start with, an internal OFDM receiver in a first block 11 processes the cyclic prefix CP. A second block 12 then effects a Fourier transformation, particularly a fast Fourier transformation FFT, with the number of discrete points N which were used for the transmitter-end method. The third receiver-end block 13 spectrally masks out a subscriber signal from the relevant subscriber k.

A fourth block 14 effects equalization in the frequency domain. Mapping, particularly a cyclic shift, is then performed in a fifth receiver-end block 15 before an RRC filter is applied in order to perform center sampling and to provide a conventional SC signal in a sixth receiver-end block 16. A seventh receiver-end block again performs an inverse fast Fourier transformation IFFT.

An eighth receiver-end block effects down-sampling with a sampling factor F as the factor F for oversampling, with a delay being taken into account in line with round(F/2). The signal which is output by the eighth receiver-end block, or the corresponding data sequence, is supplied to a detector.

Following the rectification (equalization), particularly an inverse cyclic shift to the direct component range is effected and the receiver-end RRC filter is applied in a frequency domain. Following the inverse Fourier transformation, particularly the inverse fast Fourier transformation, the filtered envelope of the single-carrier signal (SC signal) is reconstructured once more, so that, in particular, optimum decisions can be made following down-sampling with the factor F for oversampling and with a delay with the rounding value round(F/2).

FIGS. 5 and 6 are used to outline a transmitter-end device and a receiver-end device in an alternative refinement, blocks with the same reference symbols representing an identical or similar function or an identical or similar design to the arrangements shown in FIGS. 3 and 4. Accordingly, essentially only differences are described.

FIG. 5 relates to a DFT-based transmitter. For spectrally extended SC-FDMA signals, optionally both spectral extension and frequency-range RRC filtering are performed. A first block 1 again provides a data burst which is conducted to a second block 5\* for the purpose of performing a discrete Fourier transformation with a length corresponding to the number N or the number of frequencies in the first frequency space. A subsequent third transmitter-end block 20 maps a direct component DC of the data values onto the central range. A fourth transmitter-end block optionally effects spectral extension. A fifth transmitter-end block 3\* optionally affects RRC filtering in the frequency domain. Such filtering is performed since the intensity of the relevant data values to the left and right of the direct component DC is preferably meant to drop. Particularly the third to fifth transmitter-end blocks 20, 21, 3\* can also have their order interchanged. Calculations can be formed particularly by commutative matrix operations or matrix multiplications.

A subsequent sixth block 6 again affects a cyclic shift as exemplary mapping. A seventh transmitter-end block 7 again performs an inverse fast Fourier transformation IFFT, the output values of which correspond to a cyclic shift by half the number of frequencies F/2. This can be represented by the equation or function F=round(2048/N) in a block 22. Ultimately, the cyclic prefix is added in a concluding block 8. The last three components 7, 22, 8 form an internal OFDM transmitter.

The receiver end processes a signal provided and transmitted in this manner as shown in FIG. 6 in an IDFT-based receiver. For spectrally extended SC-FDMA signals, RRC filtering and a spectral combination are optionally provided.

When the transmitted and received data have been applied to a first block 11 for processing the cyclic prefix, the output data from the block are subjected to a cyclic shift by −F/2 in a second receiver-end block 23. The output values from this block are subjected to a fast Fourier transformation FFT in a third receiver-end block 12. These first three blocks form an internal OFDM receiver.

A fourth receiver-end block 13 again spectrally masks out the subscriber signal for the relevant subscriber. A fifth receiver-end block 24 optionally effects the MRC or Joint MIMO processing for the spectral compression. The output values from this fifth receiver-end block 24 are again conducted to an inverse discrete Fourier transformation in a concluding block 17\* with a length corresponding to the first number of frequencies or number N.

The main advantage is that on the basis of first experiments in the principal peak-to-average ratio (PAPR) it is possible to achieve a reduction of at least up to 3 dB, this applying at least for constant-amplitude modulation schemes, such as BPSK and QPSK. Spectrally efficient schemes with symbol configurations which are unequal in amplitude, for example 16-QAM and beyond, are no longer of such great benefit. This is shown by way of example with reference to FIG. 7, which illustrates PAPR curves for various encoding methods and various transmission methods. The price of these benefits, on the basis of first examinations for the transmitted signals, is a higher required bandwidth with a factor of 5/4.

Particularly in view of the embodiment in FIG. 3, it is also possible to make use of examinations concerning the restrictions both in view of the mean peak-to-average ratio and the obtainment of an unencoded bit error rate (BER) of $10^{-2}$ when the bandwidth of the physical resource is reduced further by zeroing in the signals at the end regions (tails) of the RRC spectrum. Portions of these end regions have little energy and do not contribute as much to the PAPR and the bit error rates. With a magnitude for a block and the physical resource of 25 and 31 subcarriers, respectively, the restrictions for PAPR and BER are still below 0.25 and 0.1 dB, but they rise quickly when even more carriers are zeroed. On the basis of first examinations, a practical ratio between block and physical resource unit therefore stands out for the RRC-filtered SC-FDMA signals, the ratio being ≈4/5 for 25/31.

Practical FDMA systems have useful load blocks and physical resource units with stipulated magnitudes which are multiples of a few basic numbers. In order to combine the SC-FDMA with and without spectral expansion for BPSK/QPSK or 16 QAM modulation with the useful load blocks of the same magnitude in a grid for a given physical resource unit, it is possible to adapt the code rate accordingly. For the definition of transmission modes in the LTE uplink, for example, it is therefore possible to take account of the code rates, which, for BPSK/QPSK, are 4/5 of the code rates for 16-QAM. In the case of the current standard with 12 carriers per resource block, other suitable ratios for block to physical resource unit for the RRC-filtered SC-FDMA signals are 10/12, 9/12 or 8/12, for example.

Figure 7:
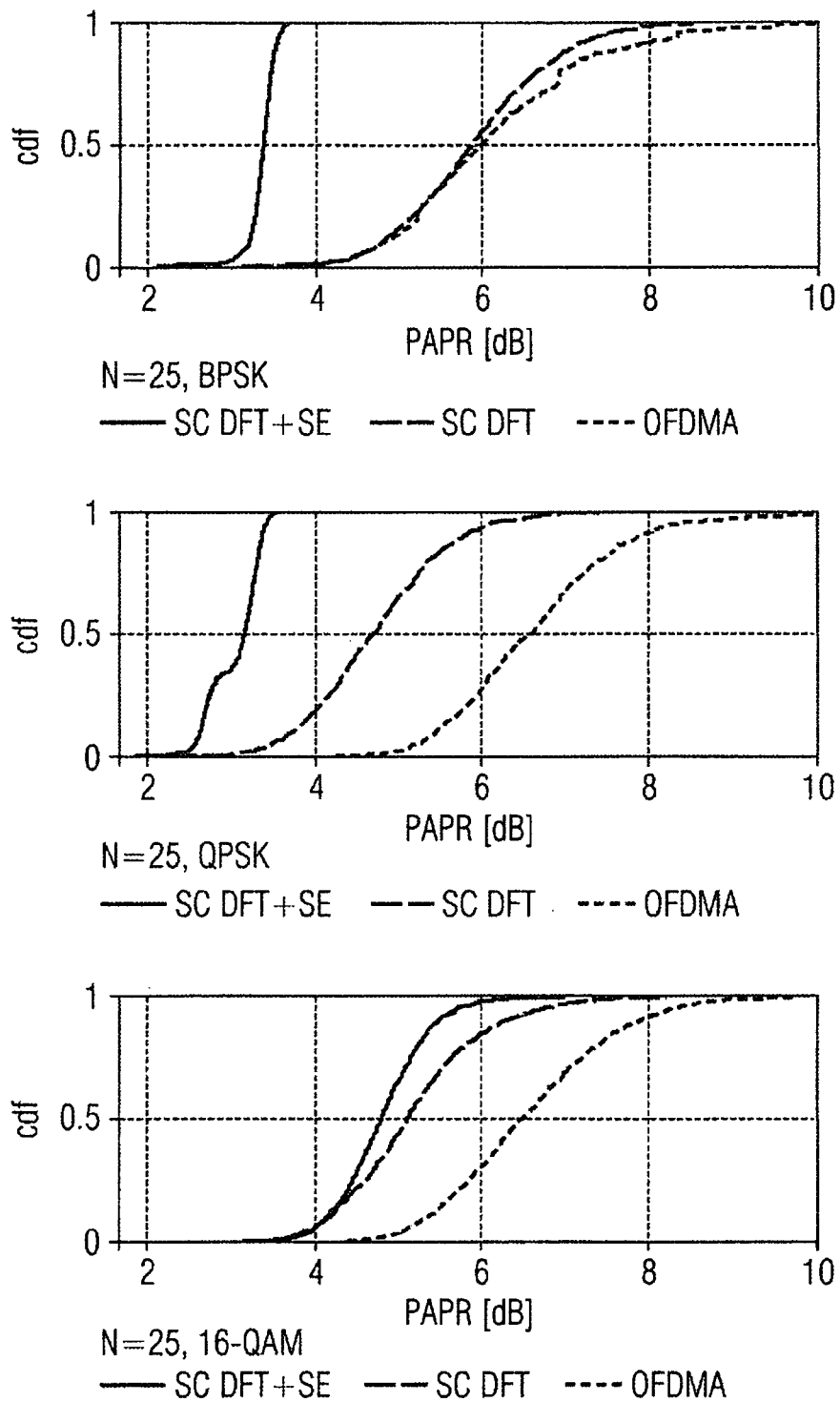
FIG. 7 shows curves to illustrate the efficiency of such procedures.

It is noted that the envelope and the peak-to-average ratio PAPR are also influenced by the modulation format. A low PAPR can be achieved only with constant-amplitude modulation. Otherwise, the gains in PAPR are partly covered by inherent power dynamics. This is illustrated in FIG. 7. It is noted that, in this case, BPSK and QPSK modulations have a constant envelope, whereas this is not the case with 16-QAM.

With BPSK (top of FIG. 7) and DFT pre-coding alone, the mean PAPR is not reduced very much. Only after the spectral expansion has been applied is the mean PAPR significantly reduced by 2.7 dB in comparison with OFDMA.

In the QPSK case (center of FIG. 7), the DFT pre-coding rises again to 2 dB and is further amplified by 1.5 dB after the spectral expansion and the RRC filtering have been applied.

However, with 16-QAM modulation (bottom of FIG. 7), the signal configurations already have significant amplitude fluctuations, and the power dynamics thus remain significant even with spectral expansion. Whereas the DFT pre-coding alone reduces the mean PAPR by roughly 1.5 dB, the spectral expansion has a lesser effect.

It is particularly also possible to design the receivers such that the spectrally extended version of SC-FDMA based on the procedure described in the present case can also allow for advanced multiantenna techniques, this being able to be utilized in order to further reduce the required transmission power of portable devices. In this regard, it is possible to resort to inherently known virtual antenna designs in line with [8], for example. In this case, the carriers redundantly added at the transmitter end during the spectral extension are regarded at the receiver end as statistically independent received signals, which can also be interpreted to mean additional reception antennas. This allows known multiantenna signal processing algorithms to be used in corresponding fashion with an appropriately increased number of virtual reception antennas.

A description will finally be given, by way of example, for the development which is preferred for including MIMO. This takes account of the fact that signals or data sequences received at the receiver end on subcarriers (n−M, n, n+M) contain redundant information on the basis of the one and the same DFT output signal $x_n$. The received signals can be regarded as virtual antenna signals in line with the statements relating to FIG. 6. Accordingly, the signals and channels can be written in subvectors $$y_j^n = \begin{pmatrix} y_j^{n-N} \\ y_j^n \\ y_j^{n+N} \end{pmatrix} h_{ij}^n = \begin{pmatrix} h_{ij}^{n-N} \\ h_{ij}^n \\ h_{ij}^{n+N} \end{pmatrix} v_j^n = \begin{pmatrix} v_j^{n-N} \\ v_j^n \\ v_j^{n+N} \end{pmatrix} \quad (1)$$

these subvectors being able to be stacked as follows $$\tilde{y}_n = \begin{pmatrix} y_1^n \\ \vdots \\ y_{N_{Rx}}^n \end{pmatrix} \tilde{H}_n = \begin{pmatrix} h_{11}^n & \cdots & h_{1N_{Tx}}^n \\ \vdots & \vdots & \vdots \\ h_{N_{Rx}1}^n & \cdots & h_{N_{Rx}N_{Tx}}^2 \end{pmatrix} \tilde{v}_n = \begin{pmatrix} v_1^n \\ \vdots \\ v_{N_{Rx}}^n \end{pmatrix}. \quad (2)$$

For each subcarrier, the $3N_{RX} \times 1$ vectors for the received signals $\tilde{y}_n$ and noise $\tilde{v}_n$ are therefore obtained. An appropriately formed $3N_{RX} \times N_{TX}$ channel matrix $H_n$ and an $N_{TX} \times 1$ vector for the transmitted signal $x_n$ are likewise obtained, $N_{Tx}$ and $N_{Rx}$ being the numbers of antennas for the transmitter and the receiver. The transmission equation is provided by $$\tilde{y}_n = \tilde{H}_n \tilde{x}_n + \tilde{v}_n. \quad (3)$$

This is a classical MIMO problem for any output signal from the DFT on the transmitter. In simple receivers, it is possible to use a minimum mean square error (MMSE) MIMO detector in order to separate the space-division multiplexed signals. Optimum detection will make use of the discrete nature of the code word at the DFT input. The receiver design is then based on the estimation of the most likely transmission sequence (MLSE: Maximum Likelihood Sequence Estimation) according to the least square distance principle, and the optimum signal processing is similar to the MIMO RAKE for MC-CDMA, which is known individually from [9] H. Chen, V. Jungnickel, V. Pohl, C. von Helmolt, "A multicode space-frequency RAKE receiver", in: Proc. 38$^{th}$ Asilomar Conference on "http://ieeexplore.ieee.org/xpl/RecentCon.jsp?punumber=9626", vol. 1, page(s): 672-676, 2004.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for single carrier frequency-division multiple access (SC-FDMA) data transmission, comprising:
    mapping a succession of input data (x(i), i=1, 2, 3 ..., N) onto a first number (N) of first frequency channels (f(1), f(2), f(3), ..., f(N)) in a first frequency space, the input data (x(i)) being mapped onto the first frequency channels to produce first transformed data signals (y(i)), i=1, 2, 3, ... N);
    mapping the first transformed data signals (y(i)) onto a second number of second frequency channels (f(1)*, f(2)*, f(3)*, ... f(N)*, ... f(Nc)*) in a second frequency space, the second number (Nc) being greater than the first number (N), the first transformed data (y(i)) being mapped onto the second frequency channels to produce second transformed data signals;
    performing an inverse transformation on the second transformed data signals, the inverse transformation producing a sequence of data signals; and
    transmitting the sequence of data signals, wherein the first transformed data signals (y(i)) are mapped into a frequency domain (f(i+1)*, ..., f(i+N)*) of the second frequency channels (f(1)*, f(2)*, f(3)*, ..., f(N)*, ..., f(Nc)*) such that a direct component (y(1) for f(1)) of the first transformed data signals (y(i)) is mapped centrally within the frequency domain (f(i+1)*, ..., f(i+N)*), wherein
    a first half of the first transformed data signals (y(i), i=1, 2, ..., N/2) is mapped, including the direct component (y(1)), in the frequency domain (f(i+1)*, ..., f(i+N)*) of the second frequency channels (f(1)*, f(2)*, f(3)*, ..., f(N)*, ..., f(Nc)*) following a second half of the first transformed data signals (y(i), i=N/2, ..., N),
    the first half of the first transformed data signals (y(i), i=1, 2, ..., N/2) is mapped, including the direct component (y(1)), onto first instances of the second frequency channels (f(1)*, f(2)*, ..., f(N/2)*), and
    the second half of the transformed data signals (y(i), i=N/2, ..., N) is mapped onto the last instances of the second frequency channels (f(N−½)*, ..., f(Nc)*), and then a cyclic shift to the frequency domain (f(i+1)*, ..., f(i+N)*) is performed.

2. The method as claimed in claim 1, wherein the frequency domain (f(i+1)*, ..., f(i+N)*) of the second frequency channels (f(1)*, f(2)*, f(3)*, ..., f(N)*, ..., f(Nc)*) is formed by a directly successive number of the second frequency channels equal to the first number of frequencies.

3. The method as claimed in claim 1, wherein the first transformed data signals (y(i)) are mapped onto directly adjacent frequency channels (f(i+1)*, ..., f(i+N)*) from the second frequency channels.

4. The method as claimed in claim 1, wherein the first transformed data signals (y(i)) are mapped with a cyclic shift into the frequency domain (f(i+1)*, ..., f(i+N)*) of the second frequency channels (f(1)*, f(2)*, f(3)*, ..., f(N)*, ..., f(Nc)*).

5. The method as claimed in claim 1, wherein a first half of the first transformed data signals (y(i), i=1, 2, ..., N/2) are subjected to such spectral expansion, for mapping into the frequency domain (f(i+1)*, ..., f(i+N)*, f(i+N+1)*, ..., f(i+2N)*) of the second frequency channels (f(1)*, f(2)*, f(3)*, ..., f(N)*, ..., f(Nc)*), through periodic reuse of the first transformed data signals, that redundancy is produced in the second frequency space.

6. The method as claimed in claim 5, wherein
    the spectral expansion involves the first half of the first transformed data signals (y(i), i=1, 2, ..., N/2) being mapped as a first block into the frequency domain (f(i+1)*, ..., f(i+N)*) of the second frequency channels (f(1)*, f(2)*, f(3)*, ..., f(N)*, ..., f(Nc)*), and
    the first half of the first transformed data signals (y(i), i=1, 2, ..., N/2) are mapped as a further block redundantly downstream of the first block into the frequency domain (f(i+N+1)*, ..., f(i+2N)*) of the second frequency channels (f(1)*, f(2)*, f(3)*, ..., f(N)*, ..., f(Nc)*), with the direct component (y(1)) being mapped in a transition area between the first and second blocks.

7. The method as claimed in claim 1, wherein filtering is performed in the frequency domain.

8. A method for processing data transmitted in line with the method claimed in claim 1, comprising:
    transforming the transmitted data signals (z(i)) into the frequency domain of the second frequency channels to produce the second transformed data signals; and
    performing an inverse mapping of the second transformed data signals onto the first number of first frequency channels (f(1), f(2), f(3), ..., f(N)).

9. The method as claimed in claim 1, wherein a discrete or fast Fourier transformation, is used to map the succession of input data (x(i), i=1, 2, 3 ..., N) onto the first number (N) of first frequency channels (f(1), f(2), f(3), ..., f(N)) in the first frequency space and to perform the inverse transformation on the second transformed data signals.

10. The method as claimed in claim 1, wherein the sequence of data signals is transmitted using a constant-amplitude modulation method.

11. The method as claimed in claim 1, wherein the sequence of data signals is transmitted using binary phase shift keying (BPSK) or Quadrature Phase Shift Keying (QPSK).

12. A method for processing data transmitted in line with the method claimed in claim 1, comprising:
transforming the transmitted data signals (z(i)) into the frequency domain of the second frequency channels to produce the second transformed data signals; and
performing an inverse mapping of the second transformed data signals onto the first number of first frequency channels (f(1), f(2), f(3), ..., f(N)).

13. An OFDM apparatus comprising:
a control device to:
map a succession of input data (x(i), i=1, 2, 3 ..., N) onto a first number (N) of first frequency channels (f(1), f(2), f(3), ..., f(N)) in a first frequency space, the input data (x(i) being mapped onto the first frequency channels to produce first transformed data signals (y(i)), i=1, 2, 3, ... N);
map the first transformed data signals (y(i)) onto a second number of second frequency channels (f(1)*, f(2)*, f(3)*, ... f(N)*, ... f(Nc)*) in a second frequency space, the second number (Nc) being greater than the first number (N), the first transformed data (y(i)) being mapped onto the second frequency channels to produce second transformed data signals; and
perform an inverse transformation on the second transformed data signals, the inverse transformation producing a sequence of data signals; and
a modulator to transmit the sequence of data signals, wherein
the first transformed data signals (y(i)) are mapped into a frequency domain (f(i+1)*, ..., f(i+N)*) of the second frequency channels (f(1)*, f(2)*, f(3)*, ..., f(N)*, ..., f(Nc)*) such that a direct component (y(1) for f(1)) of the first transformed data signals (y(i)) is mapped centrally within the frequency domain (f(i+1)*, ..., f(i+N)*) wherein
a first half of the first transformed data signals (y(i), i=1, 2, ..., N/2) is mapped, including the direct component (y(1)), in the frequency domain (f(i+1)*, ..., f(i+N)*) of the second frequency channels (f(1)*, f(2)*, f(3)*, ..., f(N)*, ..., f(Nc)*) following a second half of the first transformed data signals (y(i), i=N/2, ..., N),
the first half of the first transformed data signals (y(i), i=1, 2, ..., N/2) is mapped, including the direct component (y(1)), onto first instances of the second frequency channels (f(1)*, f(2)*, ..., f(N/2)*), and
the second half of the transformed data signals (y(i), i=N/2, ..., N) is mapped onto the last instances of the second frequency channels (f(N-½)*, ..., f(Nc)*), and then a cyclic shift to the frequency domain (f(i+1)*, ..., f(i+N)*) is performed.

14. A method for single carrier frequency-division multiple access (SC-FDMA) data transmission, comprising:
mapping a succession of input data (x(i), i=1, 2, 3 ..., N) onto a first number (N) of first frequency channels (f(1), f(2), f(3), ..., f(N)) in a first frequency space, the input data (x(i) being mapped onto the first frequency channels to produce first transformed data signals (y(i)), i=1, 2, 3, ... N);
mapping the first transformed data signals (y(i)) onto a second number of second frequency channels (f(1)*, f(2)*, f(3)*, ... f(N)*, ... f(Nc)*) in a second frequency space, the second number (Nc) being greater than the first number (N), the first transformed data (y(i)) being mapped onto the second frequency channels to produce second transformed data signals;
performing an inverse transformation on the second transformed data signals, the inverse transformation producing a sequence of data signals; and
transmitting the sequence of data signals, wherein
the first transformed data signals (y(i)) are mapped into a frequency domain (f(i+1)*, ..., f(i+N)*) of the second frequency channels (f(1)*, f(2)*, f(3)*, ..., f(N)*, ..., f(Nc)*) such that a direct component (y(1) for f(1)) of the first transformed data signals (y(i)) is mapped centrally within the frequency domain (f(i+1)*, ..., f(i+N)*), wherein
a first half of the first transformed data signals (y(i), i=1, 2, ..., N/2) are subjected to such spectral expansion, for mapping into the frequency domain (f(i+1)*, ..., f(i+N)*, f(i+N+1)*, ..., f(i+2N)*) of the second frequency channels (f(1)*, f(2)*, f(3)*, ..., f(N)*, ..., f(Nc)*), through periodic reuse of the first transformed data signals, that redundancy is produced in the second frequency space,
the spectral expansion involves the first half of the first transformed data signals (y(i), i=1, 2, ..., N/2) being mapped as a first block into the frequency domain (f(i+1)*, ..., f(i+N)*) of the second frequency channels (f(1)*, f(2)*, f(3)*, ..., f(N)*, ..., f(Nc)*), and
the first half of the first transformed data signals (y(i), i=1, 2, ..., N/2) are mapped as a further block redundantly downstream of the first block into the frequency domain (f(i+N+1)*, ..., f(i+2N)*) of the second frequency channels (f(1)*, f(2)*, f(3)*, ..., f(N)*, ..., f(Nc)*), with the direct component (y(1)) being mapped in a transition area between the first and second blocks.

15. The method as claimed in claim 14, wherein the frequency domain (f(i+1)*, ..., f(i+N)*) of the second frequency channels (f(1)*, f(2)*, f(3)*, ..., f(N)*, ..., f(Nc)*) is formed by a directly successive number of the second frequency channels equal to the first number of frequencies.

16. The method as claimed in claim 14, wherein the first transformed data signals (y(i)) are mapped onto directly adjacent frequency channels (f(i+1)* ..., f(i+N)*) from the second frequency channels.

17. The method as claimed in claim 14, wherein the first transformed data signals (y(i)) are mapped with a cyclic shift into the frequency domain (f(i+1)*, ..., f(i+N)*) of the second frequency channels (f(1)*, f(2)*, f(3)*, ..., f(N)*, ..., f(Nc)*).

18. The method as claimed in claim 14, wherein filtering is performed in the frequency domain.

19. The method as claimed in claim 14, wherein a discrete or fast Fourier transformation, is used to map the succession of input data (x(i), i=1, 2, 3 ..., N) onto the first number (N) of first frequency channels (f(1), f(2), f(3), ..., f(N)) in the first frequency space and to perform the inverse transformation on the second transformed data signals.

20. The method as claimed in claim 14, wherein the sequence of data signals is transmitted using a constant-amplitude modulation method.

* * * * *